Dec. 11, 1945.  C. MELIDONI  2,390,845

PISTON EXPANDER

Filed April 4, 1945  2 Sheets-Sheet 1

CONSTANTINE MELIDONI
*INVENTOR*

BY *Joseph Blacker*

ATTORNEY

Dec. 11, 1945.   C. MELIDONI   2,390,845
PISTON EXPANDER
Filed April 4, 1945   2 Sheets-Sheet 2

CONSTANTINE MELIDONI
*INVENTOR*

BY Joseph Blacker
*ATTORNEY*

Patented Dec. 11, 1945

2,390,845

UNITED STATES PATENT OFFICE 2,390,845

PISTON EXPANDER

Constantine Melidoni, New York, N. Y.

Application April 4, 1945, Serial No. 586,544

8 Claims. (Cl. 309—12)

In the operation of engines it is found necessary to use a scientifically designed skirt expander for the piston.

When installing piston skirt expanders known in the art, it is necessary to remove the piston and connecting rod from the engine, and the piston off the rod.

An object of this invention is to provide a piston skirt expander which can be installed while the connecting rod and the wrist pin is in assembled relation.

The piston expander disclosed in this patent application is an improvement on the piston expander disclosed in my prior patent application, Serial No. 570,493, filed December 27, 1944.

The piston skirt expander for expanding the expansible sections of the piston skirt comprise springs housed within the piston and designed to press outwardly against the resilient skirt sections and thus moulding the resilient skirt sections and forcing them to assume the contour of the slightly larger sized circle of the cylinder walls, and thus preventing piston slap.

In my said prior patent application I have mounted the expander so that it bears directly at the center line of the wrist pin bosses. In my present disclosure the spring means also presses directly at the center line of the wrist pin bosses.

Another object of this invention is to provide a resilient expander having four equal pressure sections in gripping engagement with the skirt of the piston, the expander being provided with hooks which are adapted to pass over the center line of the wrist-pin and whereby the expander is resiliently mounted in fixed position within the skirt and adapted to withstand the vibrations to which the piston is subjected.

With the above and other objects in view, the invention will be hereinafter more particularly described, and the combination and arrangement of parts will be shown in the accompanying drawings and pointed out in the claims which form part of this specification.

Reference will now be had to the drawings, wherein like numerals of reference designate corresponding parts throughout the several views, in which.

Figure 1:
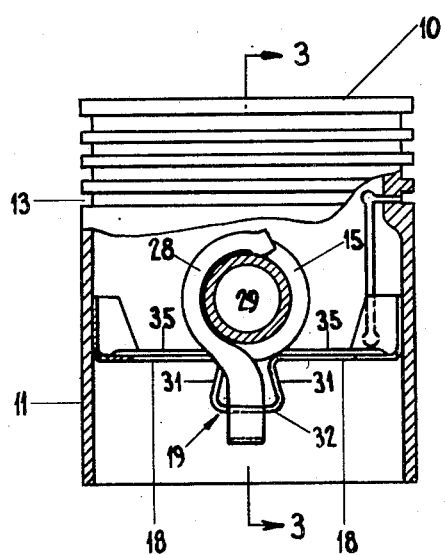
Figure 1 is a side elevation of the piston, partly broken away to show a central sectional portion and the piston skirt expander secured to the wrist pin.
Figure 4:
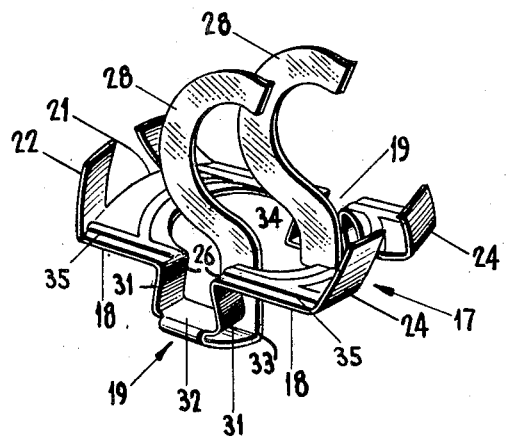
Figure 4 is a perspective view of the piston skirt expander.
Figure 2:
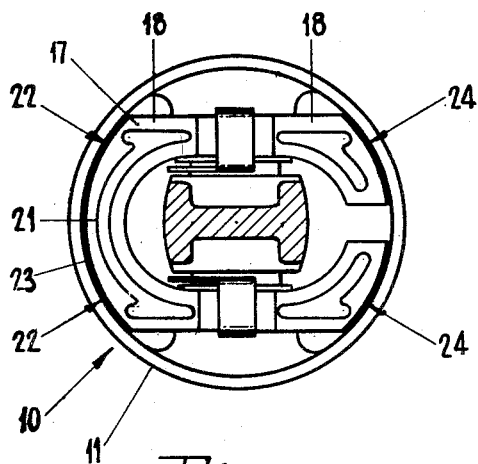
Figure 2 is a bottom view of the piston and skirt expander shown in Figure 1.
Figure 3:
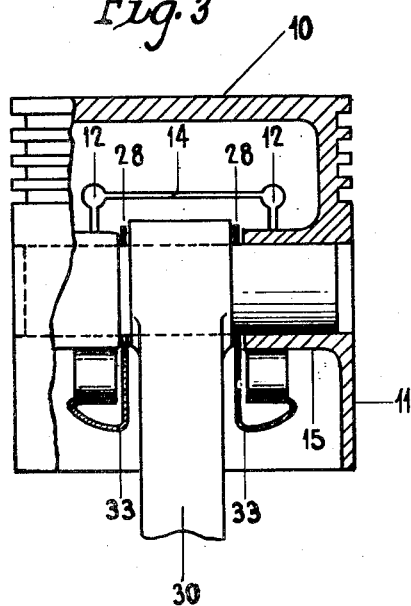
Figure 3 is a vertical section view, the section being taken as on line 3—3 in Figure 1.
Figure 5:
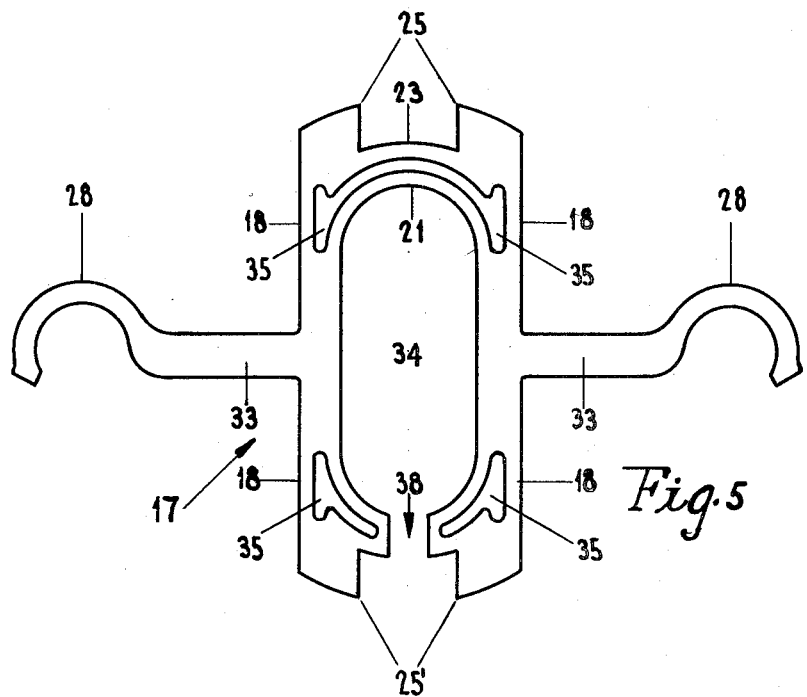
Figure 5 is a development of the expander shown in Figures 1 to 4 inclusive.

In the illustrated embodiment of the invention, the numeral 10 indicates a piston having its skirt 11 vertically slotted at 12, 12' below the bottom piston groove 13. The skirt is also provided with a horizontal slot 14 extending between the slots 12 and 12'.

The horizontal slot 14 is approximately midway between the piston pin bosses 15. The slots allow the piston skirt to contract and compensate for expansion of the piston caused by heat in the engine.

The piston skirt expander 17 is formed of spring sheet metal and is bent into substantially elliptical shape in plan view. The expander 17 comprises elongated sides 18, each having an extensible and contractible loop 19 at the middle thereof.

The sides of the expander are integrally connected at one end by a circular end member 21 having two circular pressure sections 22 which are separated by a central recessed portion 23.

At the opposite end, the sides of the expander are not connected, but terminate in two spaced-apart circular pressure sections 24. In practice, the four pressure sections 22, 22, 24, 24 assume a contour conforming to the inner circumference of the piston.

The ends of the sides 18 have continuations 25, 25', extending toward the center line of the piston-pin bosses 15. The pressure sections 22, 22, 24, 24 are thus located directly at the center line of the piston-pin bosses.

The ends 26 of the sides 18 terminate in hooks 28 which are designed to spring into engagement with a piston-pin 29 in the piston-pin bosses 15.

It will thus be seen that the sides 18 are engageable with one side of the piston-pin bosses 15 and that the hooks 28 are in resilient contacting relation with the piston-pin 29 on the side opposite.

It is to be noted that the flat-surfaced expander hooks 28 facilitate entry between the connecting rod 30 and the piston-pin bosses 15, where the clearance space is very slight.

When the expander is inserted into the piston and the hooks 28 are snapped over the piston-pin 29, and with pressure sections positioned in horizontal position, the pressure sections press firmly in opposite directions against the piston skirt.

In practice the expander 17 has a range of expansion sufficient to coact with any size piston-pin found in practice in pistons. One size expander only will take care of all piston pin diameters for any particular size of piston.

The four-point grip of the expander on the piston skirt and the fact that the resilient expander hooks pass over the center line of the piston-pin, insure that the expander will be resiliently mounted in fixed position within the skirt and adapted to withstand the vibrations to which the piston is subjected.

My one-piece expander is designed to expand opposite parts of the piston near the bosses 15 and without any necessity of slotting the piston. My expander is thus designed to operate in non-slotted pistons such as cast iron and steel pistons, which generally are not provided with slotted skirts. The pressure of the expander is sufficient to expand the skirt out of a true circle so as to contact worn cylinder walls at the bearing sides of the piston.

My piston skirt expander is quickly and easily installed and machining of the piston or alteration of the piston is not necessary. The expander restores the original shape of the piston by exerting pressure against the collapsed thrust faces of the piston, that is, at right angles to the piston-pin. It is not necessary to remove the piston-pin or the connecting rod from the piston when installing the expander.

It is to be noted that the resiliency of the hooks causes engagement with the piston-pin so that the hooks have a tendency of cushioning the play between the piston-pin and piston bosses. The hooks are in forced gripping engagement with the pin and pull the pin against the bearing surface of the piston-pin bosses, thus avoiding any piston-pin vibration.

It is further to be noted that my expander is designed to expand the piston at four independent sections, each two of which form concentric semi-circles.

It is also to be noted that each of the sides 18 of the expander 17 comprises an integral extension 31 connected by a horizontally positioned member 32. The connecting member 32 has a continuation 33 extending first radially and then laterally within a central opening 34.

As shown in Figures 1, 2, 4 and 5, the sides 18 of the expander 17 comprises reinforcing ribs 35 pressed out from the said sides and serving to reinforce the sides against bending.

Figure 6:
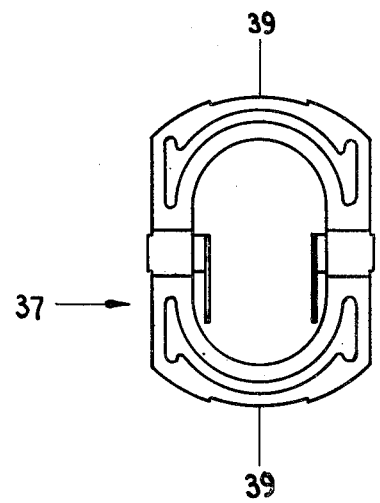
Figure 6 shows a plan view of a modified piston skirt expander.

Figure 6 shows a modified skirt expander 37 which is in all respects similar to the expander 17, with the exception that while the expander 17 has a gap 38 at one end thereof, the expander 37 does not have such a gap, and is peripherally intact, the said expander having two connecting portions 39, 39 centrally thereof.

It is to be noted that the expander herein disclosed not only expands the skirt of the piston, but also cushions the piston pin in the piston pin bosses and thus neutralizes the play due to clearance between the piston pin and the piston pin bosses.

I have thus provided a double action spring, that is a spring working in two ways:

1. By increasing the diameter of the piston skirt, and
2. At the same time neutralizing the play between the piston pin and the piston pin bosses.

In accordance with the patent statutes I have described and illustrated the preferred embodiment of my invention, but it will be understood that various changes and modifications can be made therein without departing from the spirit of the invention as defined by the appended claims.

I claim:

1. In a piston skirt expander formed of flat spring metal with a central opening and adapted to be inserted into a skirt of a piston having piston pin bosses and a piston pin, said expander having side members lying in a plane and being in spaced-apart relation from each other at the central portion of said piston, each of said side members having an integral extension connected by a horizontally positioned member, said connecting member having a continuation extending therefrom first radially and then laterally within said opening, said continuation terminating in a hook adapted to engage said piston pin, said radial portion being spaced apart from said connecting member and providing an element of resiliency whereby said hook is in resilient engagement with said piston pin, said side members having right-angular extensions at their outer ends, said extensions forming four pressure sections adapted for engagement with said piston, and means for reinforcing said side members against bending.

2. In a piston skirt expander formed of flat spring metal with a central opening and adapted to be inserted into a skirt of a piston having piston pin bosses and a piston pin, said expander having side members lying in a plane and being in spaced-apart relation from each other at the central portion of said piston, each of said side members having an integral extension connected by a horizontally positioned member, said connecting member having a continuation extending therefrom first radially and then laterally within said opening, said continuation terminating in a hook adapted to engage said piston pin, said radial portion being spaced apart from said connecting member and providing an element of resiliency whereby said hook is in resilient engagement with said piston pin, said side members having right-angular extensions at their outer ends, said extensions forming four pressure sections adapted for engagement with said piston.

3. In a piston skirt expander formed of flat spring metal with a central opening and adapted to be inserted into a skirt of a piston having piston pin bosses and a piston pin, said expander having side members lying in a plane and being in spaced-apart relation from each other at the central portion of said piston, said side members being engageable with said piston pin bosses, each of said side members having an integral extension connected by a horizontally positioned member, said connecting member having a continuation extending therefrom first radially and then laterally within said opening, said continuation terminating in a hook adapted to engage said piston pin, said radial portion being spaced apart from said connecting member and providing an element of resiliency whereby said hook is in resilient engagement with said piston pin, said side members having right-angular extensions at their outer ends, said extensions forming four pressure sections adapted for engagement with said piston.

4. In a piston skirt expander formed of flat spring metal with a central opening and adapted to be inserted into a skirt of a piston having piston pin bosses and a piston pin, said expander having side members lying in a plane and being in spaced-apart relation from each other at the central portion of said piston, said side members being engageable with said piston pin bosses, each of said side members having an integral extension connected by a horizontally positioned member, said connecting member having a continuation extending therefrom first radially and then laterally within said opening, said continuation terminating in a hook adapted to engage said piston pin, on one side of the center line thereof, said radial portion being spaced apart from said connecting member and providing an element of resiliency whereby said hook is in resilient engagement with said piston pin, said side members having right-angular extensions at their outer ends, said extensions forming four pressure sections adapted for engagement with said piston.

5. In a piston skirt expander formed of flat spring metal with a central opening and adapted to be inserted into a skirt of a piston having piston pin bosses and a piston pin, said expander having side members lying in a plane and being in spaced-apart relation from each other at the central portion of said piston, said side members being engageable with said piston pin bosses, each of said side members having an integral extension connected by a horizontally positioned member, said connecting member having a continuation extending therefrom first radially and then laterally within said opening, said continuation terminating in a hook adapted to engage said piston pin, on one side of the center line thereof and on the side opposite said point of engagement with said piston pin bosses, said radial portion being spaced apart from said connecting member and providing an element of resiliency whereby said hook is in resilient engagement with said piston pin, said side members having right-angular extensions at their outer ends, said extensions forming four pressure sections adapted for engagement with said piston.

6. In a piston skirt expander formed of flat spring metal with a central opening and adapted to be inserted into a skirt of a piston having piston pin bosses and a piston pin, said expander having side members lying in a plane and being in spaced-apart relation from each other at the central portion of said piston, each of said side members having an integral extension connected by a horizontally positioned member, said connecting member having a continuation extending therefrom first radially and then laterally within said opening, said continuation terminating in a hook adapted to engage said piston pin, said radial portion being spaced apart from said connecting member and providing an element of resiliency whereby said hook is in resilient engagement with said piston pin, for urging said piston pin in the direction of the side members of said expander and thereby cushioning said piston pin in said piston pin bosses, said side members having right-angular extensions at their outer ends, said extensions forming four pressure sections adapted for engagement with said piston.

7. In combination, a skirt expander for a piston having bosses and a piston pin, said expander being adapted to press outwardly at diametrically opposite points of said piston skirt, and means for cushioning said piston pin in said bosses.

8. In a piston skirt expander formed of flat spring metal with a central opening and adapted to be inserted into a skirt of a piston having piston pin bosses and a piston pin, said expander having side members in spaced-apart relation from each other at the central portion of said piston, each of said side members having an integral extension connected by a member having a continuation extending therefrom and terminating within said opening, the end of said continuation forming a hook adapted to engage said piston pin, said connecting member providing an element of resiliency whereby said hook is in resilient engagement with said piston pin, said side members having extensions at their outer ends, said extensions forming pressure sections adapted for engagement with said piston.

CONSTANTINE MELIDONI.